(12) United States Patent
Chen et al.

(10) Patent No.: US 10,890,981 B2
(45) Date of Patent: Jan. 12, 2021

(54) GESTURE-BASED VEHICLE CONTROL

(71) Applicant: Ford Motor Company, Dearborn, MI (US)

(72) Inventors: Yifan Chen, Ann Arbor, MI (US); Abhishek Sharma, Novi, MI (US); Qianyi Wang, Allen Park, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/342,708

(22) PCT Filed: Oct. 24, 2016

(86) PCT No.: PCT/US2016/058394
§ 371 (c)(1),
(2) Date: Apr. 17, 2019

(87) PCT Pub. No.: WO2018/080419
PCT Pub. Date: May 3, 2018

(65) Prior Publication Data
US 2019/0294251 A1    Sep. 26, 2019

(51) Int. Cl.
*G06F 3/01* (2006.01)
*B60K 37/06* (2006.01)
(Continued)

(52) U.S. Cl.
CPC .............. *G06F 3/017* (2013.01); *B60K 35/00* (2013.01); *B60K 37/06* (2013.01); *G06F 1/163* (2013.01);
(Continued)

(58) Field of Classification Search
CPC . G06F 3/017; G06F 1/163; B60K 2370/1464; B60K 2370/146;
(Continued)

(56) References Cited

U.S. PATENT DOCUMENTS 8,289,162 B2    10/2012  Mooring et al.
9,248,839 B1 *   2/2016  Tan ..................... B60W 50/08
(Continued)

FOREIGN PATENT DOCUMENTS

CN    103943106 A    7/2014
CN    104698831 A    6/2015

OTHER PUBLICATIONS

Notification of Transmittal of International Search Report and Written Opinion of International Searching Authority dated Jan. 9, 2017 regarding International Application No. PCT/US2016/058394 (10 pages).

*Primary Examiner* — Nicholas Ulrich
(74) *Attorney, Agent, or Firm* — Brandon Hicks; Bejin Bieneman PLC

(57) ABSTRACT

A computer is programmed to receive data from an occupant wearable device and detect a movement of the wearable device relative to the vehicle steering wheel based on a movement classifier. The movement classifier is created based on ground truth data indicating the movement of the wearable device while an occupant's hand contacts the vehicle steering wheel. The computer is further programmed to then cause an action in the vehicle according to the detected movement.

15 Claims, 7 Drawing Sheets

(51) Int. Cl.
*G06F 1/16* (2006.01)
*B60K 35/00* (2006.01)
*G06K 9/00* (2006.01)

(52) U.S. Cl.
CPC ..... *G06K 9/00375* (2013.01); *G06K 9/00536* (2013.01); *G06K 9/00832* (2013.01); *B60K 2370/146* (2019.05); *B60K 2370/1464* (2019.05); *B60K 2370/164* (2019.05)

(58) Field of Classification Search
CPC ......... B60K 2370/782; G06K 9/00845; G06K 9/00536; B62D 1/00; B62D 1/22
See application file for complete search history.

(56) References Cited

U.S. PATENT DOCUMENTS

| | | |
|---|---|---|
| 2015/0138086 A1 | 5/2015 | Underkoffler et al. |
| 2015/0301608 A1 | 10/2015 | Nagaraju et al. |
| 2015/0362997 A1 | 12/2015 | Hatton |
| 2016/0071393 A1 | 3/2016 | Kaplan et al. |
| 2016/0091965 A1 | 3/2016 | Wang et al. |
| 2016/0170493 A1* | 6/2016 | Park ........................ G06F 3/017 345/156 |
| 2016/0202759 A1 | 7/2016 | Choi et al. |
| 2016/0259422 A1* | 9/2016 | Funase .................... G06F 3/017 |
| 2016/0299570 A1* | 10/2016 | Davydov ................ G06F 1/163 |
| 2016/0334876 A1* | 11/2016 | Park ........................ G06F 3/017 |
| 2017/0082649 A1* | 3/2017 | Tu .......................... A61B 5/1118 |
| 2017/0120932 A1* | 5/2017 | Szczerba ............... B60W 50/10 |
| 2018/0078183 A1* | 3/2018 | Lor .................... A63B 24/0006 |

* cited by examiner

GESTURE-BASED VEHICLE CONTROL

BACKGROUND

Vehicles are very often equipped with one or more human machine interfaces. A human machine interface, often referred to as an HMI, can take a variety of forms, and can be used to provide input to and/or receive output from various vehicle elements, e.g., an infotainment system, climate control system, communications system, a heads up and/or in-dash display, etc. Present HMIs generally require a vehicle operator to look away from a view of a road or other area in which the vehicle is being operated and/or can distract the operator in other ways. For example, when a vehicle driver actuates HMI such as physical knobs, buttons, etc., and/or a vehicle touch screen, an operator may remove one or both of his or her hands from a vehicle steering wheel.

DETAILED DESCRIPTION

Introduction

Figure 1:
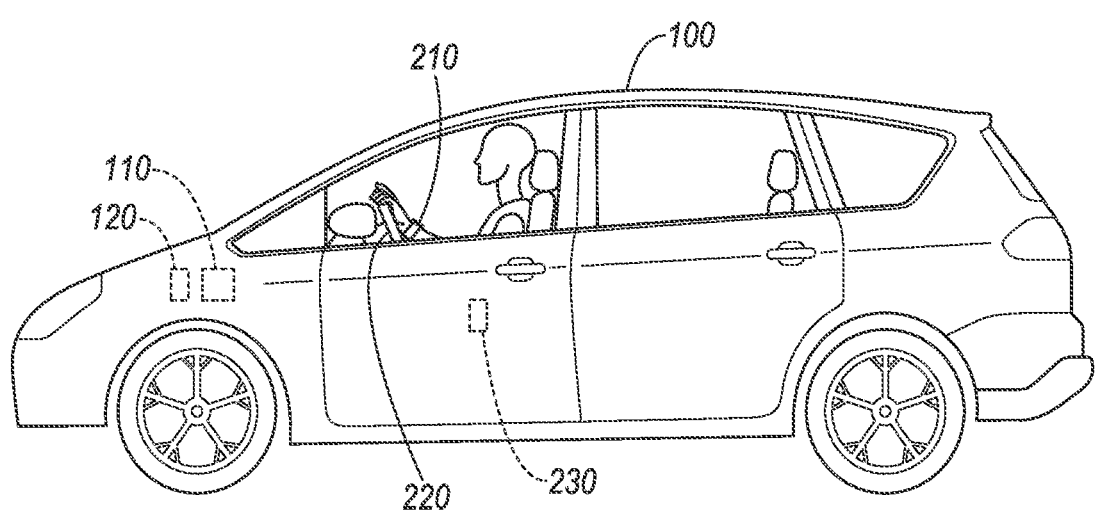
FIG. 1 is a diagram showing a vehicle, a wearable device, and a mobile phone.

With reference to the Figures, wherein like numerals indicate like parts throughout the various Figures, a wearable device 210 computer, a mobile device 230, and/or a vehicle 100 computer 110 is programmed to receive data from a wearable device 210. The computer 110 is programmed to detect a movement of the wearable device 210 relative to a vehicle 100 steering wheel 220. The computer 110 is further programmed to determine whether an occupant's hand, based on received data, is in physical contact with, i.e., touching, the steering wheel 220 at a same time as the time at which the movement is detected. The computer is yet further programmed to actuate one or more vehicle 100 components based at least on the detected movement and a determination the detected movement occurred at a time when an occupant's hand or hands were touching the steering wheel 220.

System Elements

FIG. 1 illustrates the vehicle 100, the device 210 wearable on an occupant's hand, and a mobile device 230. The vehicle 100 computer 110 can communicate with the mobile device 230 and/or the wearable device 210, e.g., via the wireless communication network.

The vehicle 100 may be powered in variety of known ways, e.g., with an electric motor and/or internal combustion engine. The vehicle 100 includes the computer 110, actuators 120, and other components including as discussed herein below.

The computer 110 includes a processor and a memory such as are known. The memory includes one or more forms of computer-readable media, and stores instructions executable by the computer 110 for performing various operations, including as disclosed herein.

The computer 110 may operate the vehicle 100 in an autonomous, semi-autonomous, or non-autonomous mode. For purposes of this disclosure, an autonomous mode is defined as one in which each of vehicle 100 propulsion, braking, and steering are controlled by the computer 110. In a semi-autonomous mode, the computer 110 controls one or two of vehicle 100 propulsion, braking, and steering. In a non-autonomous mode, the propulsion, braking, and steering are controlled by a vehicle 100 human operator.

Accordingly, the computer 110 may include programming to operate one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations.

The computer 110 is generally arranged for communications on a vehicle communication network such as a bus in the vehicle such as a controller area network (CAN) or the like. The computer 110 may include or be communicatively coupled, e.g., via a vehicle communications bus, to more than one processor, e.g., controllers or the like included in the vehicle for monitoring and/or controlling various vehicle controllers, e.g., a powertrain controller, a brake controller, a steering controller, etc.

Via the vehicle network, the computer 110 may transmit messages to various devices in the vehicle and/or receive messages from the various devices, e.g., the actuators 120, etc. Alternatively or additionally, in cases where the computer 110 actually comprises multiple devices, the vehicle communication network may be used for communications between devices represented as the computer 110 in this disclosure. Further, as mentioned below, various devices and/or sensors may provide data to the computer 110 via the vehicle communication network.

Via a wireless communication network such as Bluetooth™, the computer 110 may transmit messages to and/or receive messages from devices such as the wearable device 210, a mobile device 230, etc.

Actuators 120 in the vehicle 100 are implemented via circuits, chips, or other electronic components that can actuate various vehicle 100 components in accordance with appropriate control signals as is known. For instance, the actuators 120 may include devices such as displays, speakers, haptic modules, etc., or actuators for vehicle 100 operation control such as relays and servomotors, etc. The actuators 120, accordingly, may be used for interacting with a human operator and/or controlling one or more of braking, acceleration, and steering of the host vehicle 100. The control signals used to control the actuators 120 may be generated by the computer 110, a control unit located in the vehicle 100, e.g., the brake controller, etc. As another example, the vehicle 100 computer 110 may send signals to actuate a haptic module actuator 120, to output a graphical signal on a vehicle 100 display actuator 120 or a display associated with the wearable device 210, and/or to output an audio signal to a vehicle 100 speaker actuator 120.

The wearable device 210, e.g., a smart watch, may include sensors, chips, or other electronic components that can measure physical parameters associated with the wearable device 210 alignment and movements. For example, the physical parameters may include one or more of orientation (e.g., in a three-dimensional coordinate system having two axes parallel to a ground surface and one vertical axis) of the wearable device 210, direction and/or magnitude of velocity, acceleration, or displacement of device 210, etc. In particular, a wearable device 210 can include an accelerometer and/or a gyroscope, such as are known. The wearable device 210 may include a wireless network interface such as Bluetooth™ to communicate with the mobile device 230 and/or the vehicle 100 computer 110.

The mobile device 230, e.g., a smart phone, includes a processor and a memory such as are known. The memory includes one or more forms of computer-readable media, and stores instructions executable by the mobile device 230 computer for performing various operations, e.g., communicating with the vehicle 100 computer 110 and/or the wearable device 210.

As discussed below, the wearable device 210 and/or mobile device 230 computer may detect a movement of the wearable device 210 relative to a vehicle 100 steering wheel 220 when the occupant's hand is on the steering wheel 220. Further, the mobile device 230 computer and/or the wearable device 210 may identify a specific movement, e.g., a clockwise or counter-clockwise rotation of an occupant's wrist, of the wearable device 210 based on received data from the wearable device 210 sensors.

To detect the wearable device 210 movements, the wearable device 210 and/or mobile device 230 computer may detect a specific movement of the wearable device 210 based on the received data meeting one or more criteria associated with the specific movement. For example, an acceleration vector of the wearable device 210 may include an acceleration magnitude and an acceleration direction. Accordingly, a specific movement of the wearable device 210 may be associated with a range of acceleration magnitudes and/or a range of acceleration directions of the wearable device 210. A range may refer to values, e.g., scalar magnitude and/or directions, between two predetermined thresholds. The one or more criteria for a specific movement may be specified by a movement classifier for the specific movement. A "movement classifier," as that term is used herein, may include a set of one or more logical statements including logical and/or mathematical operations based at least on the received data, e.g., a first movement classifier may specify that an acceleration magnitude is less than a first threshold and a change of acceleration direction in a time window of 1 second is more than a second threshold.

Various techniques can be used to generate a movement classifier. As one example, a computer, e.g., a computer in a test lab, the mobile device 230 computer, and/or the vehicle 100 computer 110, can be programmed to receive ground truth data, i.e., reference data known to relate to performance of a particular movement, indicating movements of the device 210, synchronized with the data received from the wearable device 210. "Synchronized" means that ground truth data in any given time included in a measurement corresponds to the data received in the respective time from the wearable device 210. The ground truth data could include data indicating a name of a particular movement and a velocity, direction, duration or other attributes of the particular movement. Additionally, the ground truth data could include data indicating whether the occupant's hand is in contact with the steering wheel 220 when the ground truth data is obtained. For example, the ground truth data may include a hand status signal synchronized with the received data from the device 210. The hand status signal may include ON and OFF states, indicating whether occupant's hand is or is not in contact with the steering wheel 220.

The vehicle 100 computer 110, the wearable device 210 computer, the mobile device 230 computer, or any combination of them, can then calculate statistical features, e.g., maximum, mean, minimum, standard deviation, etc., of the data received from the device 210, e.g., displacement, velocity vector, acceleration vector, etc., and determine statistical features that correlate with the movements of the device 210 based on the ground truth data. Each movement classifier may include at least one association of a device 210 movement with respective statistical features. The movement classifiers for specific movements are discussed below with references to FIGS. 2A-2B.

As explained above, the ground truth data may indicate whether the occupant's hand is in contact with the steering wheel 220 when the ground truth data is obtained. The computer may be programmed to identify classifiers for detecting specific movements only if occupant's hand is in contact with the steering wheel 220 based on the hand status signal and the received data from the device 210. In other words, the computer may be programmed to identify specific statistical features of the received data from the wearable device 210 which correlate with the ground truth data indicating the movements while the occupant's hand is in contact with the steering wheel 220.

Figure 2A:
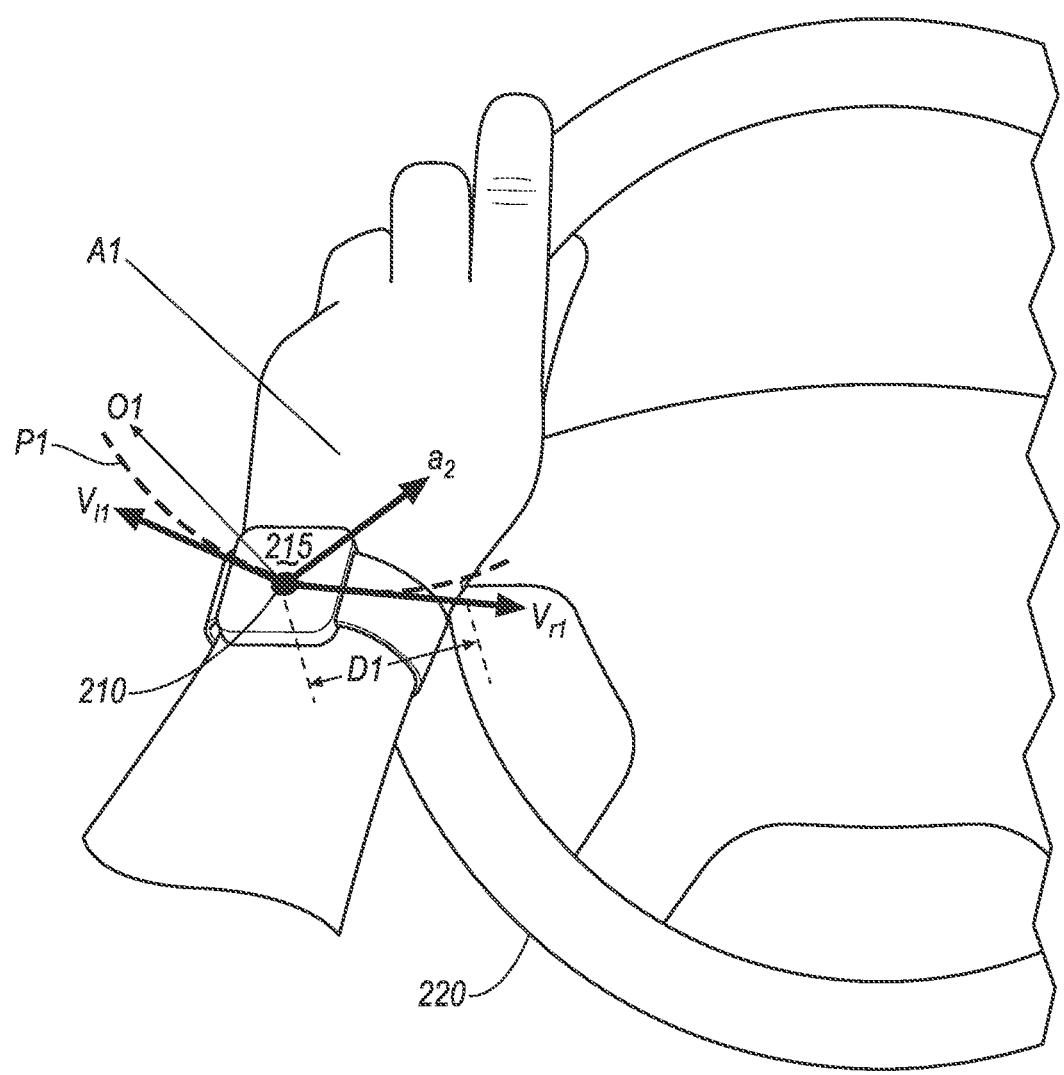
FIG. 2A is a diagram showing a movement of the wearable device of FIG. 1 relative to a steering wheel.

FIG. 2A illustrates a movement of the wearable device 210 about an axis A1 transverse to the vehicle 100 steering wheel 220. "Transverse to the steering wheel 220" herein means that an intersection of the steering wheel 220 circle, and the axis A1. An angle between the axis A1 and the steering wheel 220 may depend at least on how an occupant's hand is in contact with the steering wheel 220, e.g., based on a posture of occupant's hand while the occupant's hand grasps the steering wheel 220. In one example, the wearable device 210 moves on an example path P1 about the axis A1 while the occupant's hand is in contact with the steering wheel 220, e.g., the occupant's hand grasps the steering wheel 220. From an example first position shown in FIG. 2A, the device 210 may be moved on the path P1 in two directions, e.g., toward any of two ends of the path P1. For example, a right velocity vector $v_{r1}$ shows a velocity of the device 210 at the first position while moving to a first end of the path P1 spaced away from the first position by a distance D1. As another example, a left velocity vector $v_{l1}$ shows a movement of the device 210 from the first position toward a second end of the path P1. The velocity vectors $v_{r1}$, $v_{l1}$ include a magnitude value and a direction element. The device 210 may include an accelerometer. Velocity vectors, e.g., $v_{r1}$, $v_{l1}$, can be calculated by numerical integration of the acceleration vector, obtained from the accelerometer, over time. The velocity vectors can be calculated by a computer, e.g., the vehicle 100 computer 110, the mobile device 230, etc.

In one example, the path P1 may be a two dimensional line, e.g., curved line, or alternatively a three-dimensional space curve. about the axis A1. The movement of the device 210 about the axis A1 may be, accordingly, a rotation about the axis A1. Taking into account both the magnitude and direction of the velocity vectors $v_{r1}$, $v_{l1}$, an acceleration vector $a_2$ may represent a magnitude and direction of the acceleration of the device 210. Depending on changes of the velocity magnitude and velocity direction of the device 210, the acceleration vector $a_2$ direction may be in various directions, e.g., toward the axis A1 or away from the axis A1. When the path P1 is a three-dimensional space path, then $a_2$ may be a three-dimensional vector, i.e., the direction element of the acceleration vector $a_2$ may include three-dimensional coordinates. In one example, the device 210 may include sensors that output the acceleration vector $a_2$ to the vehicle 100 computer 110, the mobile device 230, etc. Additionally or alternatively, a computer such as the vehicle 100 computer 110 or the mobile device 230 may calculate the acceleration vector $a_2$ based at least on the velocity magnitude and direction, e.g., the velocity vectors $v_{r1}$, $v_{l1}$.

In another example, the device 210 may include sensors which output an orientation of the device 210 in a three-dimensional space. For example, the orientation of the device 210 may be represented by a three-dimensional vector perpendicular to a device 210 surface 215. Such a three-dimensional vector, e.g., including three scalar components, e.g., including triples of scalar components. The vehicle 100 computer 110 may receive the orientation data from the device 210.

In one example, the ground truth data may include data indicating the movement of the device 210 about the axis A1, as shown in FIG. 2A. Additionally, the ground truth data may include data indicating a direction of the movement about the axis A1, e.g., whether the device 210 moves toward the first end or the second end of the path P1. A lab computer or the like, i.e., a computer in a facility in which tests are performed to gather empirical data for programming a vehicle computer 110 and/or device 210, may be programmed to receive the data including one or more of the acceleration vector $a_2$, the orientation O1, the displacement value D1, and possibly other data, from the device 210. The computer can determine statistical features of the received data that correlate with the movement, e.g., rotation, of the device 210 about the axis A1 based on the ground truth data. For example, such statistical features could include mean, maximum, minimum, standard deviation, etc. Further, the computer can be programmed to identify movement classifiers for the movement about the axis A1 based at least on the determined statistical feature(s) which correlate with the movement of the device 210 about the axis A1. The vehicle 100 computer 110 can then be programmed to detect a rotation of the device 210 about the axis A1 transverse to the vehicle 100 steering wheel 220 at least based on the movement classifier and the received data from the device 210.

Additionally, based on ground truth data indicating whether the occupant's hand is on the steering wheel 220, the computer may determine movement classifier(s) for the movement about the axis A1 while the occupant's hand is in contact with the steering wheel 220. Based on such movement classifiers, the vehicle 100 computer 110 can detect a rotation of the device 210 about the axis A1 only when the occupant's hand is in contact with the steering wheel 220 at the time of the rotation about the axis A1.

Figure 2B:
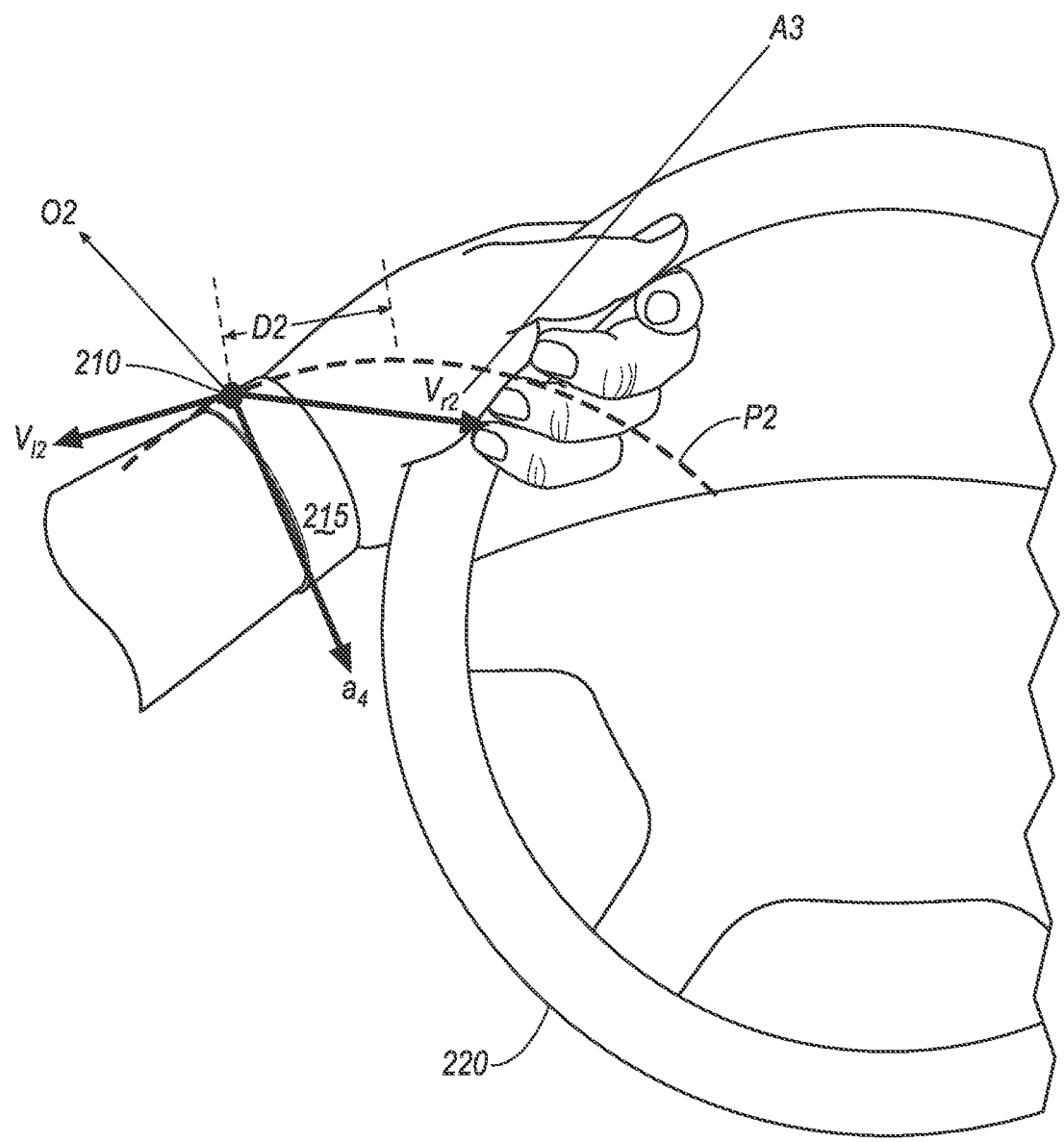
FIG. 2B is a diagram showing another movement of the wearable device of FIG. 1 relative to the steering wheel.

FIG. 2B illustrates a movement of the wearable device 210 about an axis A3 tangent to the vehicle 100 steering wheel 220. "Tangent to the steering wheel 220" means that the axis A3 touches the steering wheel 220 circle at a single point. In one example, an occupant's hand grasps a section of the steering wheel 220 which includes the single point at which the axis A3 touches the steering wheel 220. The wearable device 210 may move on an example path P2 about the axis A3 while the occupant's hand is in contact with the steering wheel 220, e.g., the occupant's hand grasps the steering wheel 220. From an example first position shown in FIG. 2B, the device 210 may be moved on the path P2 in two directions, e.g., toward any of two ends of the path P2. For example, a right velocity vector $v_{r2}$ shows a velocity of the device 210 at the first position while moving to a first end of the path P2 spaced away from the first position by a distance D2. As another example, a left velocity vector $v_{l2}$ shows a movement of the device 210 from the first position toward a second end of the path P2. The velocity vectors $v_{r2}$, $v_{l2}$ include a magnitude value and a direction element. The device 210 may include velocity sensors that output the velocity vectors $v_{r2}$, $v_{l2}$ to a computer, e.g., the vehicle 100 computer 110, the mobile device 230, etc.

In one example, the path P2 may be a two dimensional line, e.g., curved line, or alternatively a three-dimensional space curve about the axis A3. The movement of the device 210 about the axis A3 may be, accordingly, referred to as a rotation about the axis A3. Taking into account both the magnitude and direction of the velocity vectors $v_{r2}$, $v_{l2}$, an acceleration vector $a_4$ may represent a magnitude and direction of the acceleration of the device 210. Depending on changes of the magnitude and/or direction of the velocity of the device 210, the acceleration vector $a_4$ direction may be in various directions, e.g., toward the axis A3 or away from the axis A3. In one example, the device 210 may include sensors that output the acceleration vector $a_4$ to the vehicle 100 computer 110, the mobile device 230, etc. Additionally or alternatively, the vehicle 100 computer 110 or the mobile device 230 may calculate the acceleration vector $a_4$ based at least on the velocity magnitude and direction, e.g., the velocity vectors $v_{r2}$, $v_{l2}$. The vehicle 100 computer 110 may receive the orientation data O2 from the device 210, e.g., sensors. Note that the above explanation of the orientation O1 likewise applies to the orientation O2.

In one example, the ground truth data may include data indicating the movement of the device 210 about the axis A3, as shown in FIG. 2B. Here it is understood that the ground truth data may indicate various types of movements, e.g., movements about the axis A1 (see FIG. 2B) and/or movements about the axis A3. For example, various identifiers may be used in the ground truth data to distinguish among various movements. Additionally, the ground truth data may include data indicating a direction of the movement about the axis A3, e.g., whether the device 210 moves toward the first end or the second end of the path P2. A lab computer or the like may be programmed to receive the data including one or more of the velocity vectors $v_{r2}$, $v_{l2}$, the acceleration vector $a_4$, the orientation O2, the displacement value D2, and possibly other data, from the device 210. The computer can determine statistical features of the received data that correlate with the movement, e.g., rotation, of the device 210 about the axis A3 based on the ground truth data. Further, the computer can be programmed to identify movement classifiers for the movement about the axis A3 based at least on the determined statistical feature(s) which correlate with the movement of the device 210 about the axis A3.

As explained with reference to FIG. 2A, based on ground truth data indicating whether the occupant's hand is on the steering wheel 220, the computer 110 may determine movement classifier(s) for the movement about the axis A3 while the occupant's hand is in contact with the steering wheel 220. Based on such movement classifiers, device 210 or/and mobile device 230 computer can detect a rotation of the device 210 about the axis A3 only when the occupant's hand is in contact with the steering wheel 220 at the time of the rotation about the axis A3.

With reference to FIGS. 2A-2B, it is understood that the movements shown in Figures can be made without interfering with vehicle 100 steering, i.e., holding and/or rotating the vehicle 100 steering wheel 220. In other words, an occupant may make the above mentioned movements while the occupant holds and/or rotates the steering wheel 220 to steer the vehicle 100.

With continued reference to FIGS. 2A-2B, an occupant's hand may be in contact with the steering wheel 220 in various modes of vehicle 100 operation. For example, the occupant's hand may be in contact with the steering wheel 220 when the vehicle 100 is operated in the non-autonomous mode. Additionally, an occupant's hand may be in contact with the steering wheel 220 in other modes of operation such as semi-autonomous and/or autonomous mode of operation.

Figure 3:
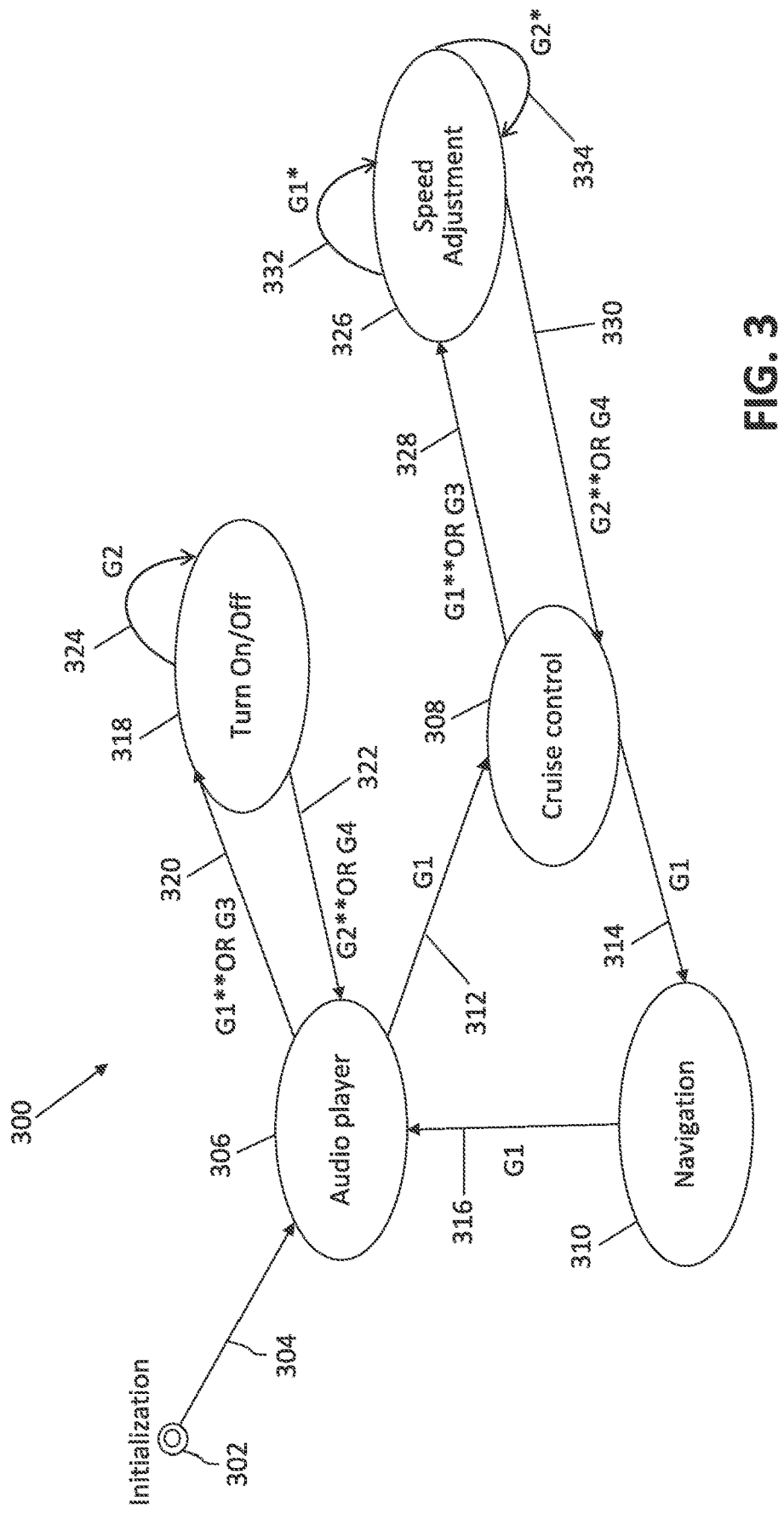
FIG. 3 is an exemplary state diagram for human machine interface based on the movements shown in FIGS. 2A-2B.

FIG. 3 illustrates an example state diagram 300 for an HMI based on detection of movements described above with reference to FIGS. 2A-2B. The mobile device 230 computer and/or vehicle 100 computer 110 may be programmed according to the state diagram 300 to control various vehicle 100 operations based on an occupant's inputs, i.e., movements, G1, G2, G3, G4, G1*, G2*, G1, and/or G2, as described in Table 1.

TABLE 1

| Identifier | Description |
| --- | --- |
| G1 | Movement about the axis A1 in the direction of $v_{r1}$ |
| G1* | Movement about the axis A1 in the direction of $v_{r1}$ with a velocity faster than a predetermine velocity threshold |
| G1** | Two consecutive movements about the axis A1 in the direction of $v_{r1}$ within a predetermined time |
| G2 | Movement about the axis A1 in the direction of $v_{t1}$ |
| G2* | Movement about the axis A1 in the direction of $v_{t1}$ with a velocity faster than a predetermine velocity threshold |
| G2** | Two consecutive movements about the axis A1 in the direction of $v_{t1}$ within a predetermined time |
| G3 | Movement about the axis A3 in the direction of $v_{t2}$ |
| G4 | Two consecutive movement about the axis A3 in the direction of $v_{t2}$ within a predetermined time |

The example state diagram 300 may include multiple states 306, 308, 310, 318, and 326 to provide an HMI for configuring and/or adjusting audio player, cruise control, and/or navigation operation of the vehicle 100. "Configuring" in the present context means enabling or disabling features associated with a respective vehicle operation, e.g., turning the audio player on or off. "Adjusting" in the present context means modifying a parameter associated with a respective vehicle operation, e.g., changing a set speed for the vehicle cruise control operation, changing a set temperature of a climate control system, etc. Additionally or alternatively, the state diagram 300 may include other states associated with one or more other vehicle operations, e.g., vehicle seat adjustment, mirror adjustments windshield wiper configuration and/or adjustment, etc.

The state diagram 300 starts in an initialization point 302, in which the mobile device 230 computer and/or device 210 detects an initialization trigger, e.g., an occupant shakes the device 210, etc., and proceeds through a transition 304 to a state 306 for controlling the vehicle audio player operation, i.e., the vehicle 100 computer 110 sets the state 306 as an active state. Alternatively, upon initialization, the state diagram 300 could have a transition to some other state, e.g., a navigation state 310.

Upon detecting a G3 or G1** movement, the mobile device 230 computer communicates with the vehicle 100 computer 110 and commands the vehicle 100 computer 110 to set, via a transition 320, a state 318 as the active state for changing the audio player status to ON or OFF. Upon detecting each G2 movement, the mobile device 230 computer communicates with vehicle 100 computer 110 and commands it to, via a returning transition 324, turn the audio player OFF if it was ON before detecting the movement G2, or vice versa.

Upon detecting a G4 or G2** movement, the vehicle 100 computer 110 sets the state 306 as the active state, via a transition 322. Additionally or alternatively, the state diagram 300 may include other states connected via transitions to the state 306, e.g., for selecting a radio channel, a music track, etc.

Upon detecting a G1 movement, the mobile device 230 computer communicates with the vehicle 100 computer 110 and commands it to set, via a transition 312, a state 308 as the active state for controlling vehicle 100 cruise control operation. For example, upon detecting a G3 or G1** movement, the vehicle 100 computer 110 sets, via a transition 328, a state 326 as the active state for adjusting a set speed of the vehicle cruise control operation. Upon detecting movements G1*, G2*, the vehicle 100 computer 110 increases or decreases the set speed, via transitions 332, 334 as seen in FIG. 3. For example, each of the movements G1*, G2* may increase or decrease the set speed by 3 km/h, or some other interval proportionate to speed at which G1* and G2* are performed.

Upon detecting a G4 or G2** movement, the mobile device 230 computer communicates and commands vehicle 100 computer 110 to set the state 308 as the active state, via a transition 330. Additionally or alternatively, the state diagram 300 may include other states connected via transitions to the state 308, e.g., for turning the cruise control operation ON or OFF.

Upon detecting a G1 movement, the mobile device 230 computer communicates and commands the vehicle 100 computer 110 to set, via a transition 314, a state 310 as the active state for controlling the navigation operation. For example, the state diagram 300 may include other states with transitions connected to the state 310 for providing configuration of vehicle navigation operation, e.g., to start or stop navigation instructions being provided via a display.

Upon detecting a G1 movement, the mobile device 230 computer communicates and commands the vehicle 100 computer 110 to set, via a transition 316, the state 306 as the active state for controlling the vehicle audio player operation, i.e., the occupant may browse through various vehicle operations (illustrated by the states 306, 308, and 310) by successive G1 movements in order to reach the vehicle operation, which is intended for configuration and/or adjustment.

The example state diagram 300 does not illustrate an end state; however, as an example, the mobile device 230 computer and/or vehicle 100 computer 110 may disable the state diagram 300 after exceeding a maximum time threshold while none of the movements relevant to the active state are detected. Relevant means the movements which may trigger an action such as a transition from the active state. Here it is understood, that the mobile device 230 computer may communicate and command the vehicle 100 computer 110 to reinitialize the state diagram 300 from the initialization point 302 upon any further initialization trigger, as discussed above.

Exemplary Process Flow

Figure 4:
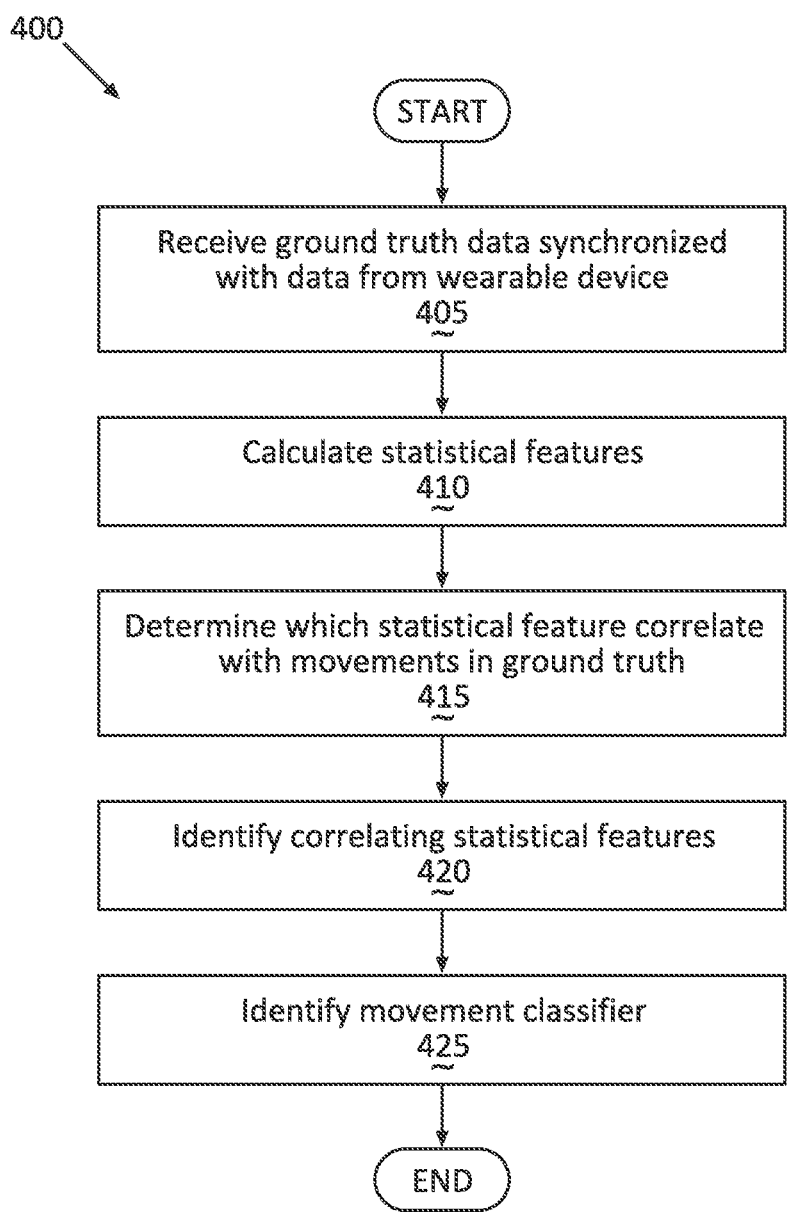
FIG. 4 is a flowchart of an exemplary process for identifying movement classifier of wearable device.

FIG. 4 is a flowchart of an exemplary process 400 for calibrating movement classifiers of a wearable device 210. A lab computer in a facility in which tests are performed to gather empirical data for programming a vehicle computer 110 and/or a vehicle 100 computer 110 may be programmed in accordance to the process 400.

The process 400 begins in a block 405, in which wearable device 210 receives ground truth data from the wearable device 210 sensors. The ground truth data include data known to relate to performance of one or more particular movements synchronized with the data, e.g., displacement, velocity, orientation, etc., received from the device 210, as discussed above. The ground truth data may include data from multiple users performing the intended hand movements (gesture) while holding the steering wheel, to reduce variations of data depending on each user movement behavior.

Next, in a block 410, a lab computer or the wearable device 210 computer further calculates the statistical features, e.g., minimum, maximum, standard deviation, etc., of the data received from the device 210.

Next, in a block 415, the lab computer receives the statistical features from wearable device 210 and calculates a correlation of statistical features of the data received from the device 210 with each of movements, e.g., the movements described with reference to FIGS. 2A-2B, in the ground truth data.

Next, in a block 420, the computer 110 identifies which statistical features correlate with each of the movements based on correlation analysis results of the block 415. The features with high correlation score will be selected as significant features and be used in the next block. For example, the computer 110 may identify that a statistical feature correlates with a movement when correlation coefficient of statistical feature and the data indicating the movement is above a predetermined coefficient threshold.

Next, in a block 425, the lab computer identifies movement classifier associated with the significant feature identification result of the block 420. The classifier is able to distinguish a device 210 movement such as a movement shown in FIG. 2A with its significant statistical features, e.g., standard deviation of the data, e.g., magnitude of angular speed, received from the device 210. Additionally, the classifier is trained to be triggered only when an occupant's hand contacts the vehicle 100 steering wheel 220.

Following the block 425, the process 400 ends.

Figure 5:
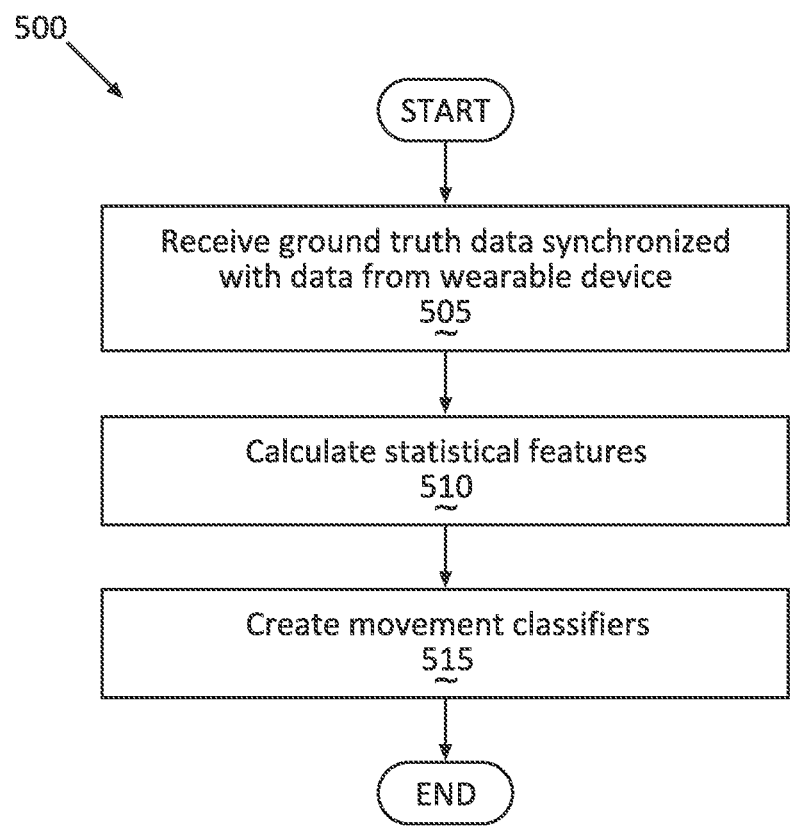
FIG. 5 is a flowchart of an exemplary process for creating the movement classifiers of FIG. 4 for a specific user.

FIG. 5 is a flowchart of process 500 for adjusting movement classifiers to a specific user. For example, a wearable device 210 computer may be programmed to execute blocks of the process 500, as described below.

The process 500 begins in a block 505, in which the wearable device 210 computer receives ground truth data from one or more wearable device 210 sensors. The ground truth data include data known to relate to performance of one or more particular movements carried out based on, e.g., an audio instruction outputted to the user requesting that the user makes a movement similar to the movement shown in FIG. 2A. The ground truth data received from the user may be used, as discussed below, to adjust the movement classifier for the user.

Next, in a block 510, the wearable device 210 computer calculates the significant statistical features of the ground truth data based on the correlation analysis result of block 420.

Next, in a block 515, the wearable device 210 computer may adjust the classifier, e.g., adjusting the thresholds used in the classifier in accordance with the ground truth data received from the user.

Following the block 515, the process 500 ends.

Figure 6:
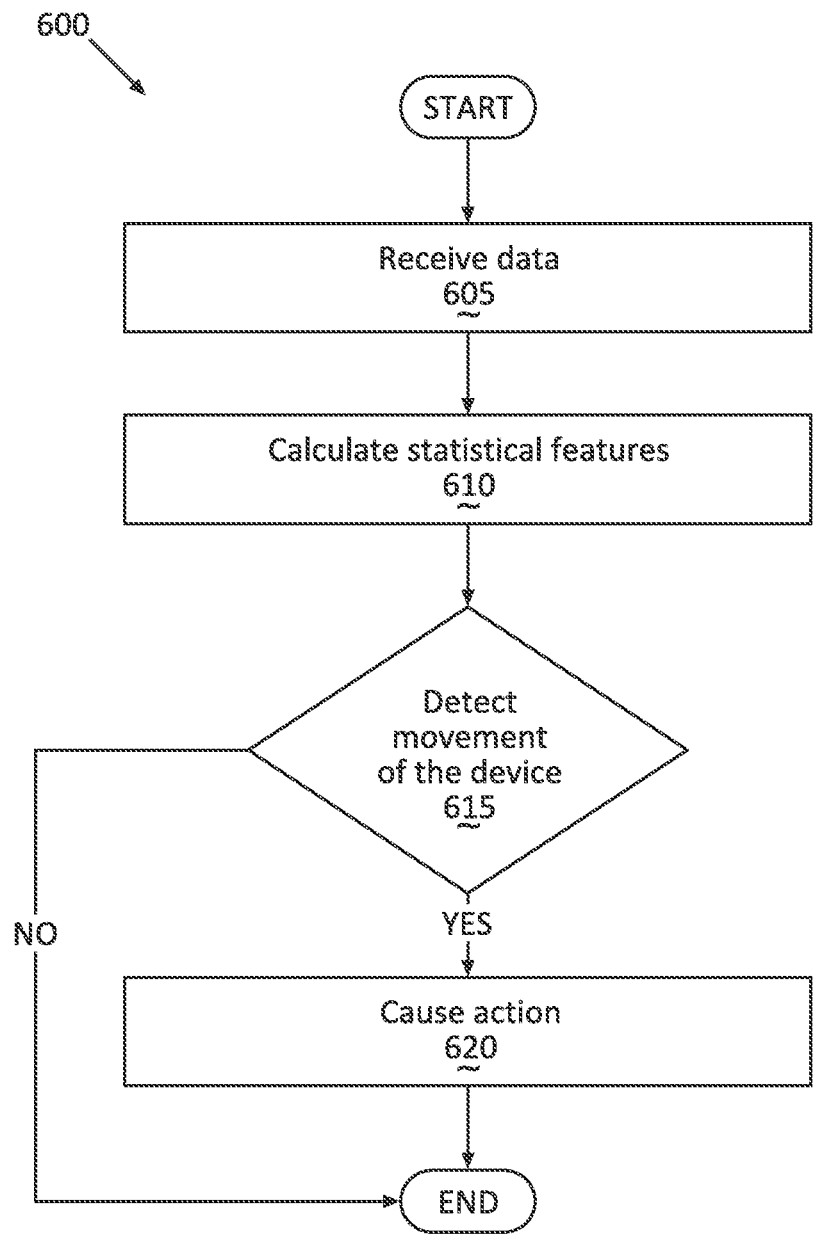
FIG. 6 is a flowchart of another exemplary process for detecting movements of the wearable device.

FIG. 6 is a flowchart of a process 600 for detecting movements of the wearable device 210. A wearable device 210 computer, a vehicle 100 computer 110 and/or the mobile device 230 may be programmed to execute blocks of the process 600 as described below.

The process 600 begins in a block 605, in which the wearable device 210 receives data from the devices 210 movement sensors. For example, the received data may include one or more physical attributes of the wearable device 210 such as an orientation of the wearable device 210 with respect to a three-dimensional coordinate system, direction and/or magnitude of angular velocity, acceleration, or displacement of device 210 with respect to the coordinate system, etc.

Next, in a block 610, the wearable device 210 computer calculates the significant statistical features of the data received from the wearable device, e.g., the statistical features used in the movement classifier.

Next, in the decision block 615, the wearable device 210 computer may detect a movement of the device 210 such as described above with reference to FIGS. 2A-2B. As one example, the device 210 may detect the movements based on the received data and the classifiers associated with the movements if an occupant's hand contacts the vehicle 100 steering wheel 220, i.e., an occupant's hand is in physical contact with the steering wheel 220 at a same time as the time at which the movement is detected. If the movement classifiers are adjusted for a user of the wearable device 210 in accordance to the process 500, then the wearable device 210 computer may be more likely to detect the movements of the user compared to detection based on the movement classifiers identified based on data received from multiple users. If the wearable device 210 computer detects one or more of the movements specified by the movement classifiers, then the process 600 proceeds to a block 620; otherwise the process 600 ends or alternatively returns to the block 605 to receive data.

Next, in a block 620, the recognition results of block 615 may be sent to vehicle 100 computer 110 via mobile device 230. The vehicle 100 computer 110 causes an action based on the detected movement, e.g., sending one or more actuating signals to a vehicle 100 actuator 120. For example, the vehicle 100 computer 110 may send a signal to a display associated with the vehicle 100 and/or a device 210 concerning information to display, send an actuating signal to a vehicle 100 controller such as a cruise controller, send an actuating signal to a vehicle 100 haptic module, etc.

Following the block 620, the process 600 ends or returns to the block 605 to receive data.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH, an EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A computer, comprising a processor and a memory, the memory storing instructions executable by the processor to:
   receive data from an occupant wearable device;
   detect a movement of the occupant wearable device relative to a steering wheel of a vehicle based on a movement classifier at least by detecting (1) a first rotation of the occupant wearable device about a first axis intersecting and defining an angle with a plane defined by a circumference of the steering wheel and (2) a second rotation of the occupant wearable device about a second axis tangent to the circumference of the steering wheel, wherein the movement classifier is created based on ground truth data indicating the movement of the occupant wearable device while an occupant's hand contacts the steering wheel of the vehicle;
   cause a first action in the vehicle according to the detected first rotation and a second action according to the detected second rotation;
   receive ground truth data synchronized with the data received from the occupant wearable device, the received ground truth data indicating movements of occupant wearable device;
   calculate statistical features including at least one of a mean, maximum, minimum and standard deviation of the data received from the occupant wearable device;
   determine one or more statistical features that correlate with the movements of the occupant wearable device based on the ground truth data; and
   identify movement classifiers based at least on the determined one or more statistical features that correlate with the movements of the occupant wearable device, each movement classifier including at least an association of one of the movements of the occupant wearable device with respective one or more statistical features.

2. The computer of claim 1, wherein the received ground truth data indicating whether the occupant's hand is in contact with the steering wheel of the vehicle.

3. The computer of claim 1, wherein the received ground truth data indicating a rotation of the occupant wearable device about the first axis.

4. The computer of claim 1, wherein the ground truth data indicating a rotation of the occupant wearable device about the second axis.

5. The computer of claim 1, further programmed to detect the movement of the occupant wearable device relative to the steering wheel of the vehicle based at least partially on the movement classifiers.

6. The computer of claim 1, wherein the ground truth data is received from the occupant wearable device.

7. The computer of claim 1, wherein the first or second actions are one of actuating a haptic module, outputting a graphical signal on a display associated with at least one of the vehicle and the occupant wearable device.

8. The computer of claim 1, is further programmed to select the first or second action based at least on one of a velocity, a direction, and number of repetition of the detected movement.

9. A method, comprising:
   receiving data from an occupant wearable device;
   using the received data, detecting a movement of the occupant wearable device relative to a steering wheel of a vehicle based on a movement classifier at least by detecting (1) a first rotation of the occupant wearable device about a first axis intersecting and defining an angle with a plane defined by a circumference of the steering wheel and (2) a second rotation of the occupant wearable device about a second axis tangent to the circumference of the steering wheel, wherein the movement classifier is created based on ground truth data indicating the movement of the occupant wearable device while an occupant's hand contacts the steering wheel of the vehicle and wherein the first axis intersects the steering wheel;
   causing a first action in the vehicle according to the detected first rotation and a second action according to the detected second rotation;
   receiving ground truth data synchronized with the data received from the occupant wearable device, the received ground truth data indicating movements of the occupant wearable device;
   calculating statistical features including at least one of a mean, maximum, minimum and standard deviation of the data received from the occupant wearable device;
   determining one or more statistical features that correlate with the movements of the occupant wearable device based on the received ground truth data; and
   identifying movement classifiers based at least on the determined one or more statistical features that correlate with the movements of the occupant wearable device, each movement classifier including at least an association of one of the movements of the occupant wearable device with respective one or more statistical features.

10. The method of claim 9, wherein the first or second actions are one of actuating a vehicle actuator, outputting an actuating signal to a vehicle controller, outputting a graphical signal on a display associated with at least one of the vehicle and the occupant wearable device.

11. The method of claim 9, wherein the received ground truth data indicating whether the occupant's hand is in contact with the steering wheel of the vehicle.

12. The method of claim 9, wherein the received ground truth data indicating a rotation of the occupant wearable device about the first axis.

13. The method of claim 9, wherein the received ground truth data indicating a rotation of the occupant wearable device about the second axis.

14. The method of claim 9, wherein the ground truth data is received from the occupant wearable device.

15. A computer, comprising a processor and a memory, the memory storing instructions executable by the processor to:
  receive data from an occupant wearable device;
  detect a movement of the occupant wearable device relative to a steering wheel of a vehicle based on a movement classifier, wherein the movement classifier is created based on ground truth data indicating the movement of the occupant wearable device while an occupant's hand contacts the steering wheel of the vehicle;
  cause an action in the vehicle according to the detected movement;
  receive ground truth data synchronized with the data received from the occupant wearable device, the received ground truth data indicating movements of the occupant wearable device;
  calculate statistical features including at least one of a mean, maximum, minimum and standard deviation of the data received from the occupant wearable device;
  determine one or more statistical features that correlate with the movements of the occupant wearable device based on the ground truth data; and
  identify movement classifiers based at least on the determined one or more statistical features that correlate with the movements of the occupant wearable device, each movement classifier including at least an association of one of the movements of the occupant wearable device with respective one or more statistical features.

* * * * *